(12) United States Patent
Hirosawa

(10) Patent No.: US 9,134,576 B2
(45) Date of Patent: Sep. 15, 2015

(54) LIQUID CRYSTAL DISPLAY DEVICE

(71) Applicant: Japan Display Inc., Minato-ku (JP)

(72) Inventor: Jin Hirosawa, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 23 days.

(21) Appl. No.: 14/067,279

(22) Filed: Oct. 30, 2013

(65) Prior Publication Data

US 2014/0118649 A1    May 1, 2014

(30) Foreign Application Priority Data

Oct. 31, 2012  (JP) ................. 2012-240303

(51) Int. Cl.
*G02F 1/1343* (2006.01)
*G02F 1/1362* (2006.01)

(52) U.S. Cl.
CPC .... *G02F 1/134309* (2013.01); *G02F 1/134363* (2013.01); *G02F 1/136213* (2013.01); *G02F 1/136286* (2013.01); *G02F 2001/134318* (2013.01)

(58) Field of Classification Search
USPC .......................................................... 349/41
See application file for complete search history.

(56) References Cited

U.S. PATENT DOCUMENTS

| | | | | |
|---|---|---|---|---|
| 6,137,557 | A * | 10/2000 | Hebiguchi et al. | 349/141 |
| 6,256,081 | B1 * | 7/2001 | Lee et al. | 349/141 |
| 6,266,116 | B1 * | 7/2001 | Ohta et al. | 349/141 |
| 6,819,384 | B2 * | 11/2004 | Nakanishi et al. | 349/141 |
| 2001/0010575 | A1 | 8/2001 | Yoshida et al. | |
| 2004/0165136 | A1 | 8/2004 | Sugiyama et al. | |
| 2005/0128410 | A1 * | 6/2005 | Lee | 349/141 |
| 2005/0206824 | A1 | 9/2005 | Son et al. | |
| 2005/0219453 | A1 | 10/2005 | Kubo et al. | |
| 2007/0115234 | A1 | 5/2007 | Kim et al. | |
| 2008/0062358 | A1 | 3/2008 | Lee et al. | |
| 2008/0180590 | A1 | 7/2008 | Lee et al. | |
| 2008/0180623 | A1 | 7/2008 | Lee et al. | |
| 2008/0186439 | A1 | 8/2008 | Kwon et al. | |
| 2011/0007250 | A1 * | 1/2011 | Ono | 349/106 |
| 2012/0182509 | A1 * | 7/2012 | Takano et al. | 349/123 |
| 2012/0236239 | A1 * | 9/2012 | Morita et al. | 349/123 |
| 2012/0268703 | A1 * | 10/2012 | Funakoshi et al. | 349/139 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

* cited by examiner

*Primary Examiner* — Dung Nguyen
*Assistant Examiner* — Shan Liu
(74) *Attorney, Agent, or Firm* — Oblon, McClelland, Maier & Neustadt, L.L.P.

(57) ABSTRACT

An array substrate includes a gate line extending in a first direction, a source line extending in a second direction orthogonally crossing the first direction, and a switching element electrically connected with the gate line and the source line. A first sub-common electrode extends in the first direction facing the gate line. A first main-common electrode is connected with the first sub-common electrode and extends in the second direction facing the source line. A pixel electrode includes a main-pixel electrode linearly extending in a direction different from the first and second directions. A second substrate includes a second main-common electrode extending in the second direction so as to face the first main-common electrode. The potential of the second main-common electrode is the same as the first main-common electrode.

6 Claims, 7 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2012-240303 filed Oct. 31, 2012, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention.

The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate. As one example, a portion of the pixel electrode covers a gate line and shields electric field from the gate line.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
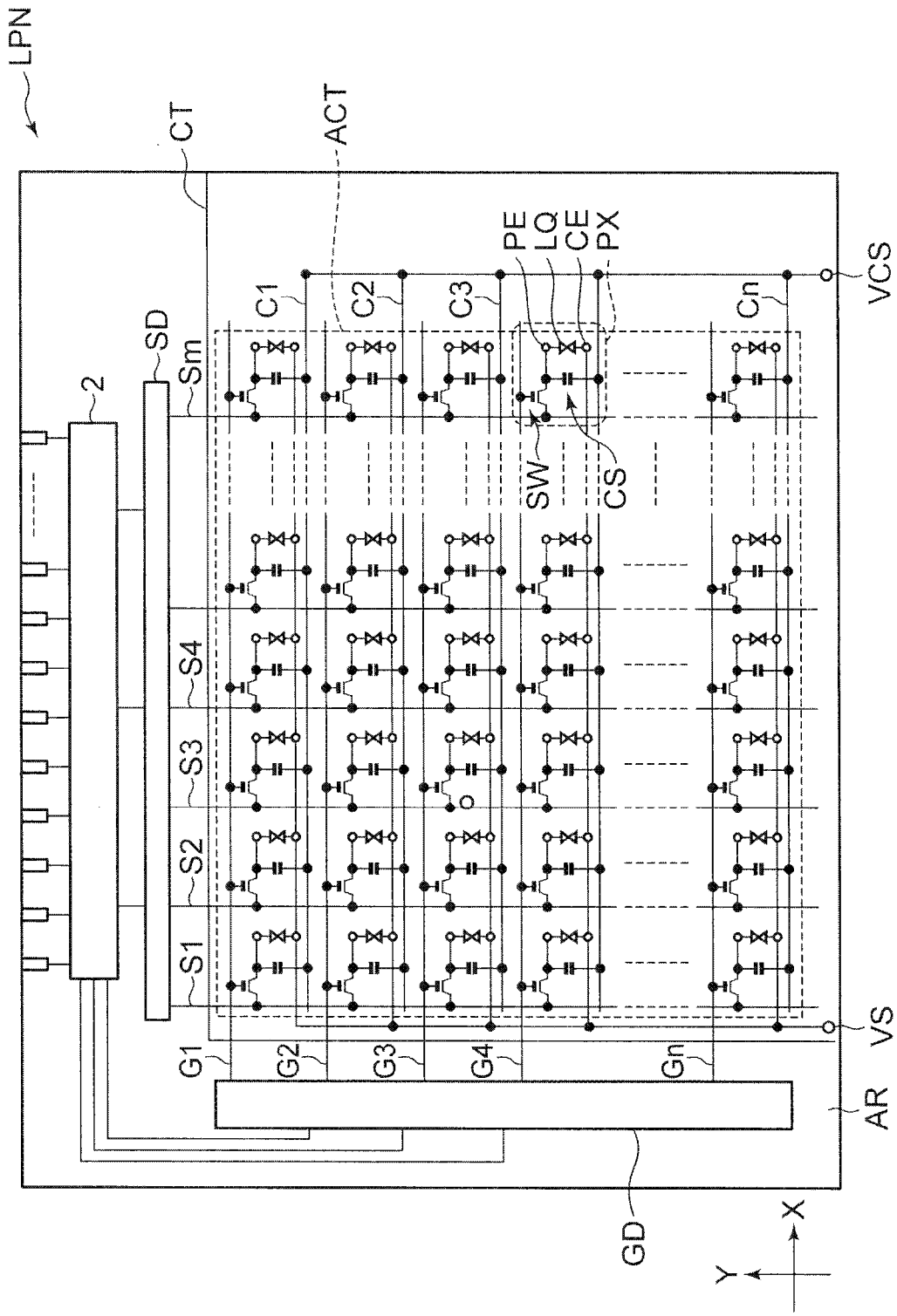
FIG. 1 is a figure schematically showing a structure and the equivalent circuit of a liquid crystal display device according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line extending in a first direction, a source line extending in a second direction orthogonally crossing the first direction, a switching element electrically connected with the gate line and the source line, a first sub-common electrode extending in the first direction and facing the gate line, a first main-common electrode connected with the first sub-common electrode and extending in the second direction, the first main-common electrode facing the source line, and a pixel electrode including a main-pixel electrode linearly extending in a direction different from the first and second directions, the pixel electrode electrically connected with the switching element and formed of transparent conductive material; a second substrate including a second main-common electrode extending in the second direction so as to face the first main-common electrode, wherein the potential of the second main-common electrode is the same as the first main-common electrode; and a liquid crystal layer held between the first substrate and the second substrate, and including liquid crystal molecules initially aligned along the second direction.

According to other embodiment, a liquid crystal display device includes: a first substrate including; a gate line extending in a first direction, a source line extending in a second direction orthogonally crossing the first direction, a switching element electrically connected with the gate line and the source line, a first interlayer insulating film covering the switching element, a first sub-common electrode formed on the first interlayer insulating film extending in the first direction and facing the gate line, a first main-common electrode formed on the first interlayer insulating film and connected with the first sub-common electrode, the first main-common electrode extending in the second direction and facing the source line, a second interlayer insulating film covering the first sub-common electrode and the first main-common electrode, a pixel electrode including a main-pixel electrode formed on the second interlayer insulating film and linearly extending in a direction different from the first and second directions, the pixel electrode electrically connected with the switching element, a second substrate including a second main-common electrode extending in the second direction so as to face the first main-common electrode, wherein the potential of the second main-common electrode is the same as the first main-common electrode; and a liquid crystal layer held between the first substrate and the second substrate, and including liquid crystal molecules initially aligned along the second direction.

According to other embodiment, a liquid crystal display device includes: a first substrate including; a first gate line and a second gate line respectively extending in a first direction, an auxiliary capacitance line arranged between the first gate line and the second gate line and extending in a first direction, a first source line and a second source line extending in a second direction orthogonally crossing the first direction, a switching element electrically connected with the first gate line and the first source line, and a pixel electrode electrically connected with the switching element, a second substrate including a main-common electrode extending in the second direction on the both sides sandwiching the pixel electrode; and a liquid crystal layer held between the first substrate and the second substrate, and including liquid crystal molecules initially aligned along the second direction, wherein the pixel electrode includes; a first main-pixel electrode linearly extending between the first gate line and the auxiliary capacitance line in a direction different from the first and second directions, the first main-pixel electrode including a first end located on the auxiliary capacitance side more close to the first source line than the second source line, and a second end located on the first gate line side more close to the second source line than the first source line, a second main-pixel electrode linearly extending between the second gate line and the auxiliary capacitance line in a direction different from the first and second directions, the second main-pixel electrode including a third end located on the auxiliary capacitance line side more close to the first source line than the second source line, and a fourth end located on the second gate line side more close to the second source line than the first gate line, a first sub-pixel electrode connected with the first and third ends on the auxiliary capacitance line and extending toward the second source line in the first direction, a second sub-pixel electrode connected with the second end and extending toward the first source line along the first gate line in the first direction, and a third sub-pixel electrode connected with the fourth end and extending toward the first source line along the second gate line in the first direction.

According to other embodiment, a liquid crystal display device includes: a first substrate including; a first gate line and a second gate line respectively extending in a first direction, an auxiliary capacitance line arranged between the first gate line and the second gate line and extending in the first direction, a first source line and a second source line extending in a second direction orthogonally crossing the first direction, a switching element electrically connected with the first gate line and the first source line, and a pixel electrode electrically connected with the switching element, a second substrate including a main-common electrode extending in the second direction on the both sides sandwiching the pixel electrode; and a liquid crystal layer held between the first substrate and the second substrate, and including liquid crystal molecules initially aligned along the second direction, wherein the pixel electrode includes; a main-pixel electrode linearly extending between the auxiliary capacitance line and the second gate line in a direction different from the first and second directions, the main-pixel electrode including a first end located on the auxiliary capacitance side more close to the second source line than the first source line, and a second end located on the second gate line side more close to the first source line than the second source line, a first sub-pixel electrode connected with the first end on the auxiliary capacitance line and extending toward the first source line in the first direction, and a second sub-pixel electrode connected with the second end and extending toward the second source line along the second gate line in the first direction.

According to other embodiment, a liquid crystal display device includes: a first substrate including; a first gate line and a second gate line respectively extending in a first direction, an auxiliary capacitance line arranged between the first gate line and the second gate line and extending in a first direction, a first source line and a second source line extending in a second direction orthogonally crossing the first direction, a switching element electrically connected with the first gate line and the first source line, and a pixel electrode electrically connected with the switching element, a second substrate including a main-common electrode extending in the second direction on the both sides sandwiching the pixel electrode; and a liquid crystal layer held between the first substrate and the second substrate, and including liquid crystal molecules initially aligned along the second direction, wherein the pixel electrode includes; a first main-pixel electrode linearly extending between the first gate line and the auxiliary capacitance line in a direction different from the first and second directions, the first main-pixel electrode including a first end located on the first source line side more close to the first gate line than the auxiliary capacitance line, and a second end located on the second source line side more close to the auxiliary capacitance line than the first gate line, a second main-pixel electrode linearly extending between the second gate line and the auxiliary capacitance line in a direction different from the first and second directions, the second main-pixel electrode including a third end located on the first source line side more close to the second gate line than the auxiliary capacitance line, and a fourth end located on the second source line side more close to the auxiliary capacitance line than the second gate line, a first sub-pixel electrode connected with the first and third ends and extending along the first source line in the second direction, a second sub-pixel electrode connected with the second end and extending toward the first gate line along the second source line in the second direction, and a third sub-pixel electrode connected with the fourth end and extending toward the second gate line along the second source line in the second direction.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is formed of a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "in" source lines S (S1-Sm), etc., in the active area ACT. The gate line G and the auxiliary capacitance line C linearly extend in a first direction, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S may not necessarily extend linearly, and a portion thereof may be crooked partly.

Each gate line G is pulled out to outside of the active area ACT, and connected to a gate driver GD. Each source line S is pulled out to the outside of the active area ACT, and connected to a source driver SD. At least a portion of the gate driver GD and the source driver SD is formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which the auxiliary capacitance voltage is impressed.

The switching element SW is formed of an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel PX and electrically connected with the switching element SW. The common electrode CE is arranged in common to the plurality of pixel electrodes PE through the liquid crystal layer LQ. An electric power supply portion VS is formed outside of the active area ACT to impress a voltage to the common electrode CE. Furthermore, the common electrode CE is drawn to outside of the active area ACT and electrically connected with the electric power supply portion VS through an electric conductive component which is not illustrated.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to a X-Y plane specified by the first direction and the second direction orthogonally crossing the first direction i.e., the substrates (or lateral electric field substantially in parallel with the principal surface of the array substrate AR.)

Figure 2:
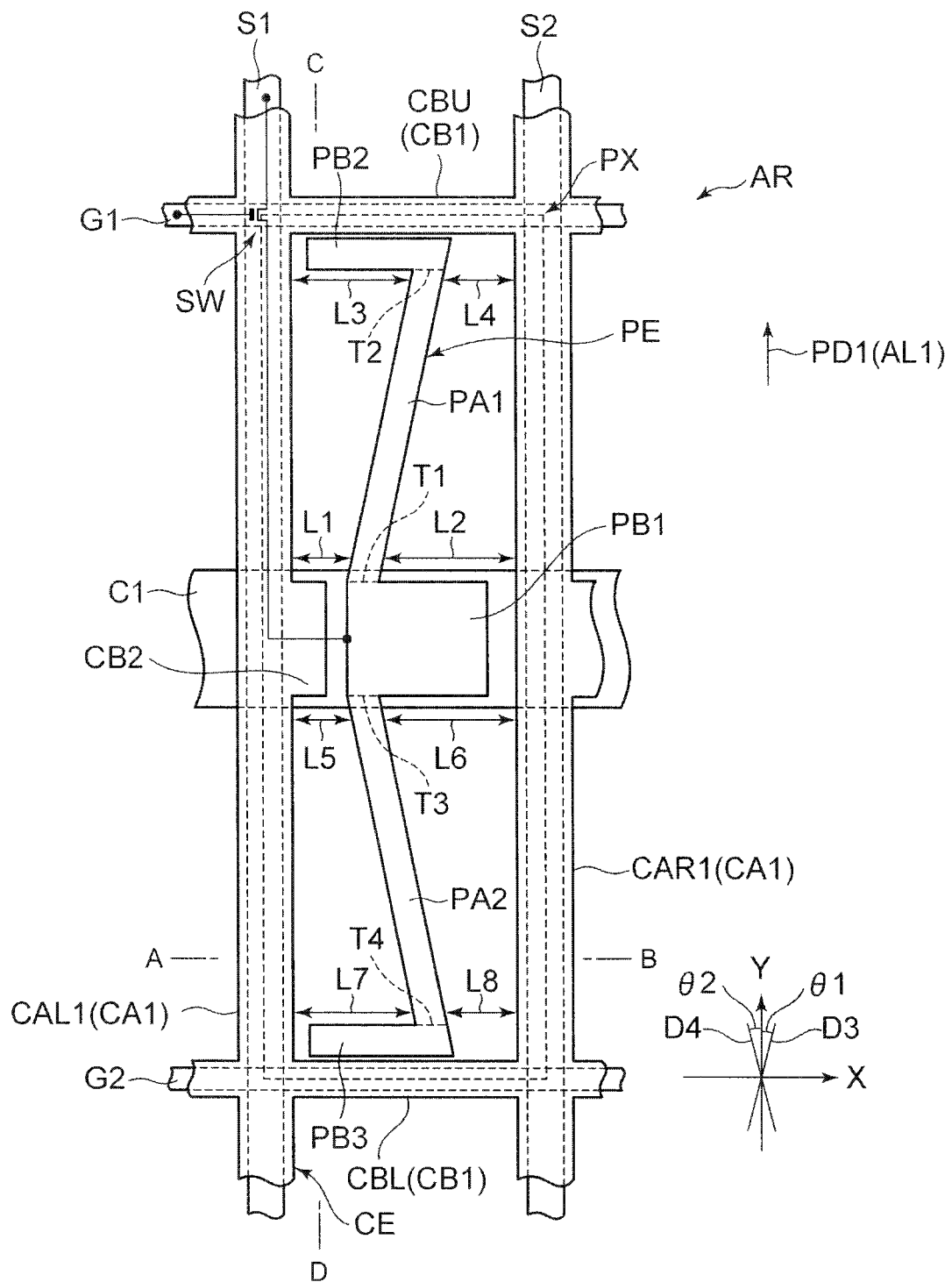
FIG. 2 is a plan view schematically showing a structure of one pixel when an array substrate shown in FIG. 1 is seen from a counter substrate side according to the embodiment.

FIG. 2 is a plan view schematically showing the structure of one pixel when the liquid crystal display panel according to an embodiment is seen from the counter substrate side.

The array substrate AR is equipped with a gate line G1, a gate line G2, an auxiliary capacitance line C1, a source line S1, a source line S2, a switching element SW, a pixel electrode PE, and a portion of a common electrode CE, a first alignment film AL1, etc.

The gate line G1 and the gate line G2 are arranged at intervals in the second direction Y and extend in the first direction X, respectively. The auxiliary capacitance line C1 is located between the gate line G1 and the gate line G2 and extends along the first direction X. In the illustrated example, the auxiliary capacitance line C1 is located in the approximately middle between the gate line G1 and the gate line G2. That is, the interval between the gate line G1 and the auxiliary capacitance line C1 in the second direction Y is approximately the same as the interval between the gate line G2 and the auxiliary capacitance line C1 in the second direction Y. The source line S1 and the source line S2 are arranged at interval in the first direction X and extends in the second direction Y, respectively. The pixel electrode PE is arranged between the adjacent source line S1 and the source line S2. Moreover, the pixel electrode PE is located between the gate line G1 and the gate line G2.

In this embodiment, the pixel PX corresponds to a square region surrounded with the gate lines G1 and G2 and the source lines S1 and S2, and is formed in the shape of a rectangle whose length in the first direction X is shorter than the length in the second direction Y, as shown with a dashed line in FIG. 2. The length in the first direction X of the pixel PX corresponds to a pitch between the source line S1 and the source line S2 in the first direction X, and the length in the second direction Y of the pixel PX corresponds to a pitch between the gate line G1 and the gate line G2 in the second direction Y.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand aide. The source line S2 is arranged at the right-hand side end. Similarly, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel adjoining the illustrated pixel PX on its upper end side. The gate line G2 is arranged at a lower end portion. Precisely, the gate line G2 is arranged striding over a boundary between the illustrated pixel and a pixel adjoining the illustrated pixel PX on its lower end side. The auxiliary capacitance line C1 is arranged approximately in a central portion of the pixel PX.

The switching element SW is electrically connected with the gate line G1 and the source line S1 in the illustrated example. Namely, the switching element SW is formed in an intersection of the gate line G1 with the source line S1 and includes a semiconductor layer which is not shown. The semiconductor layer is formed, for example, with poly-silicon, and located under the source line S1. The semiconductor layer intersects the gate line G1 and extends under the auxiliary capacitance line C1. The source electrode of the switching element SW corresponds to a region which contacts the semiconductor layer in the source line S1. The gate electrode of the switching element SW corresponds to a region which intersects the semiconductor layer in the gate line G1. The drain electrode of the switching element SW is in contact with the semiconductor layer which extends under the auxiliary capacitance line C1.

The pixel electrode PE is electrically connected with the switching element SW. The pixel electrode PE is equipped with a first main-pixel electrode PA1, a second main-pixel electrode PA2, a first sub-pixel electrode PB1, a second sub-pixel electrode PB2, and a third sub-pixel electrode PB3. The first main-pixel electrode PA1, the second main-pixel electrode PA2, the first sub-pixel electrode PB1, the second sub-pixel electrode PB2, and the third sub-pixel electrode PB3 are integrally or continuously formed and electrically connected mutually.

The first main-pixel electrode PA1 is located between the source line S1 and the source line S2, and located between the gate line G1 and the auxiliary capacitance line C1. The first main-pixel electrode PA1 linearly extends in a third direction D3 different from the first direction X and the second direction Y, and is formed in the shape of a belt with substantially the same width. That is, the first main-pixel electrode PA1 is not in parallel to the source line S1 and the source line S2, and extends in an oblique direction in the pixel PX. The angle θ1 made by the third direction D3 and the second direction Y is smaller than the angle made by the third direction D3 and the first direction X.

In the illustrated example, the first main-pixel electrode PA1 includes a first end T1 located on the auxiliary capacitance line C1 side, and a second end T2 located on the gate line G1 side. The first end T1 is arranged more close to the source line S1 than the source line S2. The second end T2 is arranged more close to the source line S2 than the source line S1. That is, the interval L1 between the first end T1 and the source line S1 in the first direction X is smaller than the interval L2 between the first end T1 and the source line S2 in the first direction X. Moreover, the interval L3 between the second end T2 and the source line S1 in the first direction X is larger than the interval L4 between the second end T2 and the source line S2 in the first direction X. Moreover, the interval L1 is smaller than the interval L3, and the interval L2 is larger than the interval L4.

The second main-pixel electrode PA2 is located between the source line S1 and the source line S2, and between the gate line G2 and the auxiliary capacitance line C1. The second main-pixel electrode PA2 linearly extends to a fourth direction D4 different from the first direction X, the second direction Y, and the third direction D3, and is formed in the shape of a belt with substantially the same width. That is, the second main-pixel electrode PA2 is not in parallel to the source line S1 and the source line S2, and extends in an oblique direction in the pixel PX. The angle θ2 made by the fourth direction D4 and the second direction Y is smaller than the angle made by the fourth direction D4 and the first direction X. For example, the fourth direction D4 and the third direction D3 are line symmetric with respect to the second direction Y. The angle θ1 is substantially the same as angle θ2.

In the illustrated example, the second main-pixel electrode PA2 has a third end T3 located on the auxiliary capacitance line C1 side, and a fourth end T4 located on the gate line G2 side. The third end T3 is arranged more close to the source line S1 than the source line S2, and the fourth end T4 is arranged more close to the source line 82 than the source line S1. That is, the interval L5 between the third end T3 and the source line S1 in the first direction X is smaller than the interval L6 between the third end T3 and the source line S2 in the first direction X. Moreover, the interval L7 between the fourth end T4 and the source line S1 in the first direction X is larger than the interval L8 between the fourth end T4 and the source line S2 in the first direction X. Moreover, the interval L5 is smaller than the interval L7, and the interval L6 is larger than the interval L8. In addition, the interval L1 is approximately the same as the interval L5, the interval L2 is approximately the same as the interval L6, the interval L3 is approximately the same as the interval L7, and the interval L4 is approximately the same as the interval L8.

The first sub-pixel electrode PB1 is located on the auxiliary capacitance line C1. Moreover, the first sub-pixel electrode PB1 linearly extends between the source line S1 and the source line S2 in the first direction X, and is formed in the shape of a belt with substantially the same width. In the illustrated example, the first sub-pixel electrode PB1 is connected with the first end T1 of the first main-pixel electrode PA1 and the third end T3 of second main-pixel electrode PA2, and extends toward the source line S2 in the first direction X. The first sub-pixel electrode PB1 hardly extends toward the source line S1 from the position in which the first sub-pixel electrode PB1 is connected with the first end T1 and the third end T3. In addition, although not explained in detail, the first sub-pixel electrode PB1 is in contact with the drain electrode of the switching element SW in a position which overlaps with the auxiliary capacitance line C1.

The second sub-pixel electrode PB2 and the third sub-pixel electrode PB3 linearly extend between the source line S1 and the source line S2 in the first direction X, and formed in the shape of a belt with substantially the same width. In the illustrated example, the second sub-pixel electrode PB2 is connected with the second end T2 of the first main-pixel electrode PA1, and extends toward the source line S1 along the gate line G1 in the first direction X. The second sub-pixel electrode PB2 hardly extends toward the source line 82 from the position in which the second sub-pixel electrode PB2 is connected with the second end T2. The third sub-pixel electrode PB3 is connected with the fourth end T4 of the second main-pixel electrode PA2, and extends toward the source line S1 along the gate line G2 in the first direction X. The third sub-pixel electrode PB3 hardly extends toward the source line S2 from the position in which the third sub-pixel electrode PB3 is connected with the fourth end T4.

In the pixel electrode PE, the shape of "Z" is made by the first main-pixel electrode PA1, the first sub-pixel electrode PB1, and the second sub-pixel electrode PB2. Similarly, the shape of "Z" is made by the second main-pixel electrode PA2, the first sub-pixel electrode PB1, and the third sub-pixel electrode PB3. Moreover, the pixel electrode PE has the form of line symmetric with respect to the first sub-pixel electrode PB1.

The common electrode CE is arranged apart from the pixel electrode PE. The common electrode CE is equipped with a first main-common electrode CA1, a first sub-common electrode CB1 and a second sub-common electrode CB2. The first main-common electrode CA1, the first sub-common electrode CB1 and the second sub-common electrode CB2 are formed integrally or continuously, and electrically connected mutually. The common electrode CE is connected to an electric supply portion VS outside of the active area ACT, and set to common potential.

The first main-common electrode CA1 counters the source line S. Moreover, the first main-common electrode CA1 is located on the both sides sandwiching the main-pixel electrode PA in the X-Y plane, and linearly extends along the second direction Y. The first main-common electrode CA1 is formed in the shape of a belt with substantially the same width along the first direction X. In addition, the first main-common electrode CA1 shown here has the width equal to or more than the source line S, and is arranged in the position which overlaps with the source line S.

In the illustrated example, the first main-common electrode CA1 is arranged in two parallel lines at intervals in the first direction X, and equipped with a first main-common electrode CAL1 located on the left-hand side end of the pixel PX, and a first main-common electrode CAR1 located in the right-hand side end of the pixel PX. The first main-common electrode CAL1 counters the source line S1, and the first main-common electrode CAR1 counters the source line 82.

The first sub-common, electrode CB1 counters the gate line G. The first sub-common electrode CB1 linearly extends along the first direction X in the X-Y plane. The first sub-common electrode CB1 is formed in a belt shape with substantially the same width in the second direction Y. In addition, the sub-common electrode CB1 shown here has the width equal to or more than the gate line G, and is arranged in the position which overlaps with the gate line G. The first sub-pixel electrode CB1 is connected with the first main-common electrode CA1.

In the illustrated example, the first sub-common electrode CB1 is arranged in two parallel lines at intervals in the second direction Y, and equipped with a first sub-common electrode CBU located in the upper end of the pixel PX and a first sub-common electrode CBL located in the bottom end of the pixel PX. The first sub-common electrode CBU counters the gate line G1, and the first sub-common electrode CBL counters the gate line G2.

The second sub-common electrode CB2 is located on the auxiliary capacitance line C1, and linearly extends along the first direction X in the X-Y plane. The second sub-common electrode CB2 is formed in a belt shape with substantially the same width along the second direction Y. The second sub-pixel electrode CB2 is connected with the first main-common electrode CA1. In the illustrated example, the second sub-common electrode CB2 is connected with the first main-common electrode CAL1 and extends toward the first sub-pixel electrode PB1 in the first direction X so as to be apart from the first sub-pixel electrode PB1.

In the array substrate AR, the pixel electrode PE is covered with the first alignment film AL1. Alignment treatment is carried out to the first alignment film AL1 along with an alignment treatment direction PD1 to initially align liquid crystal molecules of the liquid crystal layer LQ. The alignment treatment direction PD1 is substantially in parallel to the second direction Y, for example.

Figure 3A:
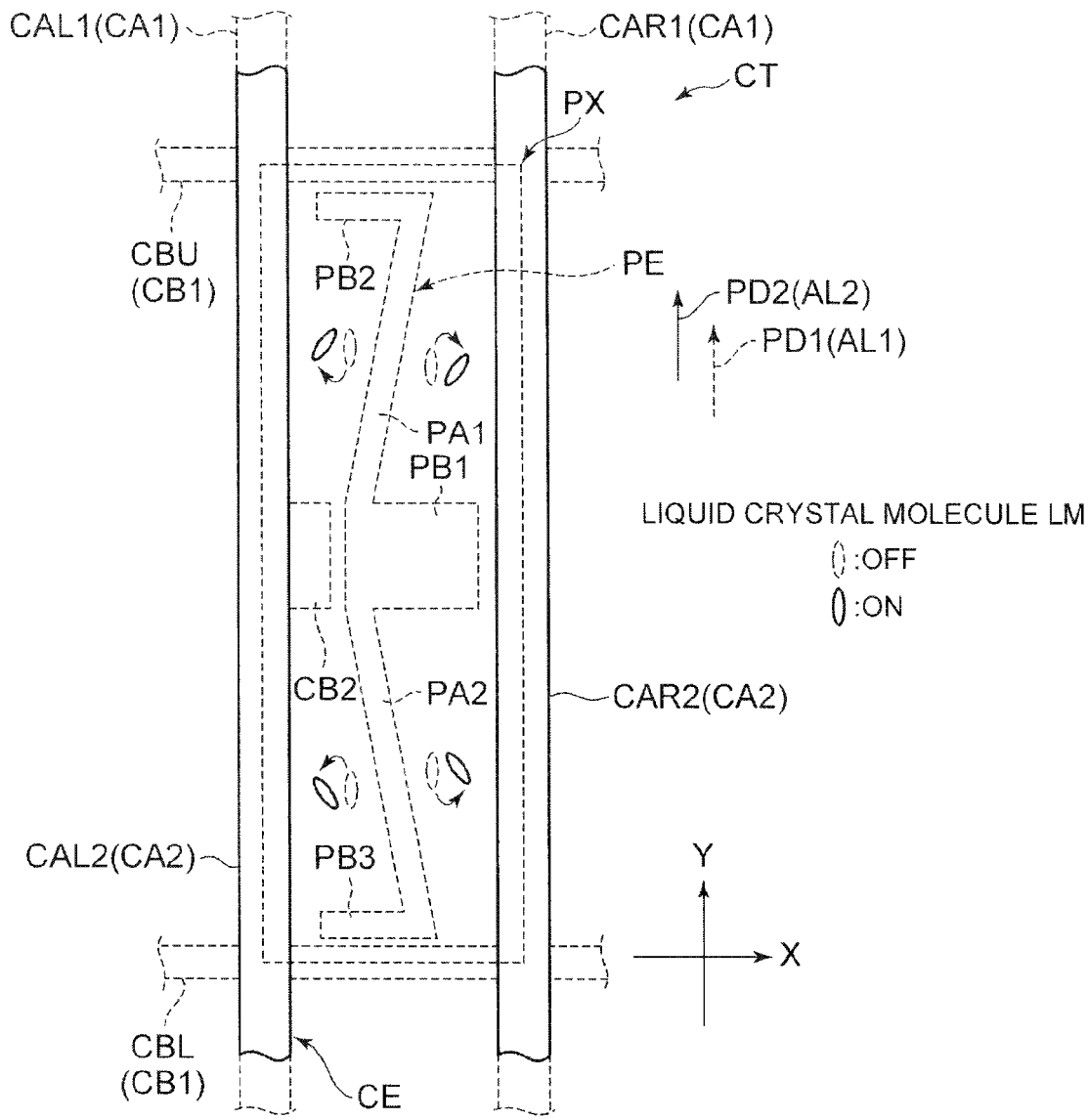
FIG. 3A is a plan view schematically showing a structure of one pixel PX in a counter substrate CT shown in FIG. 1.
Figure 3B:
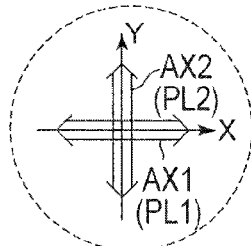
FIGS. 3B and 3C are figures showing alignment axes.
Figure 3C:
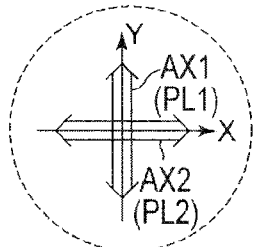

FIG. 3A is a plan view schematically showing a structure of one pixel PX in the counter substrate CT shown in FIG. 1. Here, the plan view in the X-Y plane is shown. In addition, only composition required for explanation is illustrated, and the dashed line shows portions of the pixel electrodes PE and the common electrodes CE which are the principal portions of the array substrate. FIGS. 3B and 3C are drawings showing alignment axes.

The counter substrate CT is equipped with a second main-common electrode CA2 which is a portion of the common electrodes CE. The second main-common electrode CA2 is electrically connected with the electric supply portion VS of the array substrate outside of the active area, for example, or electrically connected with the first main-common electrode CA1, etc., on the array substrate. The second main-common electrode CA2 is set to the same potential as the first main-common electrode CA1.

The second main-common electrode CA2 is located on the both sides sandwiching the pixel electrode PE in the X-Y plane, and linearly extends along the second direction Y. The second main-common electrode CA2 is located on the first main-common electrode CA1. The second main-common electrode CA2 is formed in the shape of a belt with substantially the same width along the first direction X.

In the illustrated example, the second main-common electrode CA2 is arranged with two parallel lines at intervals in the first direction X, and equipped with a second main-common electrode CAL2 arranged in the left-hand side of the pixel PX and striding over a boundary between the illustrated pixel and the pixel adjacent to the left-hand side, and a second main-common electrode CAR2 arranged in the right-hand side of the pixel and striding over a boundary between the illustrated pixel and the pixel adjacent to the right-hand side of the pixel PX. The second main-common electrode CAL2 counters with the first main-common electrode CAL1. The second main-common electrode CAR2 counters with the first main-common electrode CAR1.

In the counter substrate CT, the second main-common electrode CA2 is covered with the second alignment film AL2. Alignment treatment is carried out to the second alignment film AL2 along with an alignment treatment direction PD2 to initially align the liquid crystal molecules of the liquid crystal layer LQ. Here, the alignment treatment means a rubbing treatment process or a light treatment process, for example. The alignment treatment direction PD2 is in parallel to the first alignment treatment direction PD1, and the same direction as the alignment treatment direction PD1 in the illustrated example. In addition, the alignment treatment direction PD1 and the alignment treatment direction PD2 may be opposite directions mutually. Furthermore, while both treatment directions are the same directions, both treatment directions may be the directions opposite to those shown in the illustrated example, i.e., the direction from the gate line G1 toward the gate line G2

Figure 4:
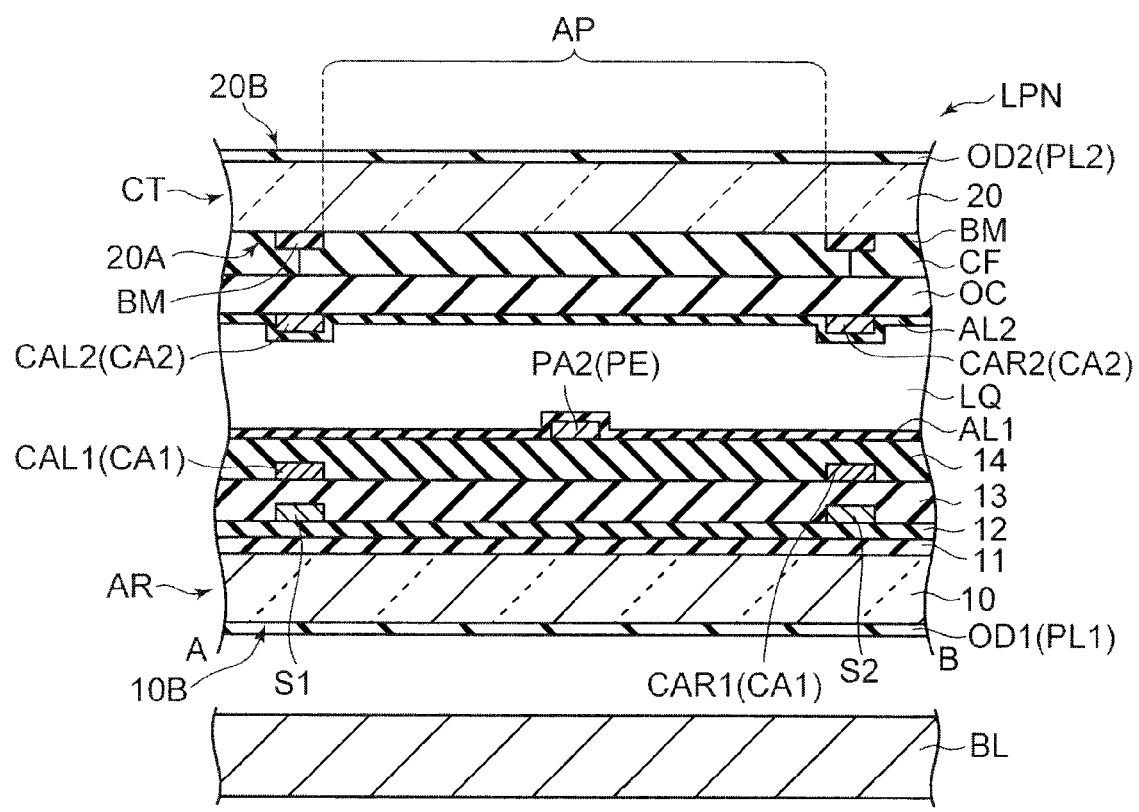
FIG. 4 is a cross-sectional view schematically showing the structure of the liquid crystal display panel LPN taken along line A-B shown in FIG. 2.
Figure 5:
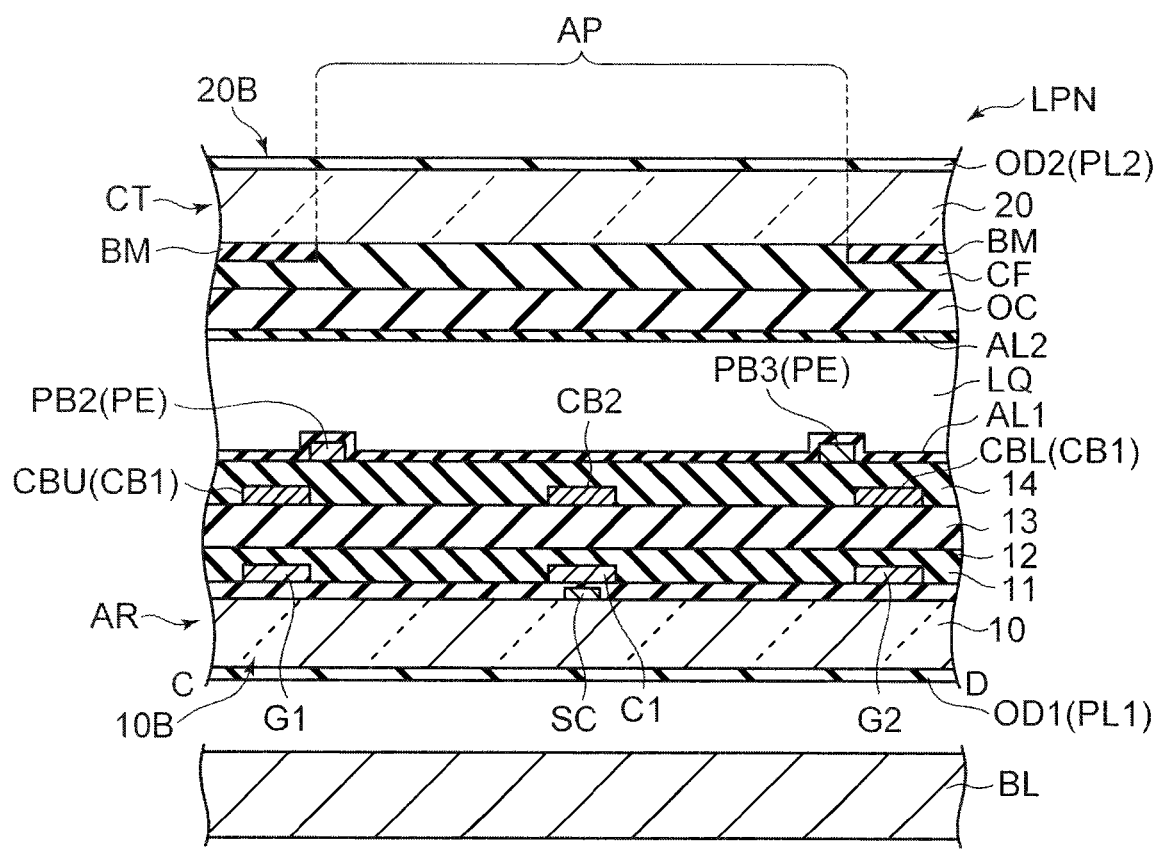
FIG. 5 is a cross-sectional view schematically showing the structure of the liquid crystal display panel LPN taken along line C-D shown in FIG. 2.

FIG. 4 is a cross-sectional view schematically showing the cross-sectional structure of the liquid crystal display panel LPN taken along line A-B shown in FIG. 2. FIG. 5 is a cross-sectional view schematically showing the structure of the liquid crystal display panel LPN taken along line C-D in FIG. 2.

A backlight BL is arranged on the back side of the array substrate AR in the illustrated example. Various types of backlights BL can be used. For example, a light emitting diode (TAD) or a cold cathode fluorescent lamp (CCFL), etc., can be applied as a light source of the backlight BL, and the explanation about its detailed structure is omitted.

The array substrate AR is formed using a first transparent insulating substrate 10. The array substrate AR includes a semiconductor layer SC formed of poly-silicon of the switching element which is not explained in detail, the gate line G1, the gate line G2, the auxiliary capacitance line C1, the source line S1, the source line S2, the pixel electrode PE, the first main-common electrode CA1, the first sub-common electrode CB1, the second sub-common electrode CB2, a first insulating film 11, a second insulating film 12, a third insulating film 13, a fourth insulating film 14, and the first alignment AL1, etc, inside of the first transparent insulating substrate 10 facing the counter substrate CT.

The semiconductor layer SC is formed between the first insulating substrate 10 and the first insulating film 11, and located under the auxiliary capacitance line C1. The auxiliary capacitance line C1, the gate line G1, and the gate line G2 are formed on the first insulating film 11, and covered with the second insulating film 12. The auxiliary capacitance lines C1, the gate line G1, and the gate line G2 can be formed simultaneously by the same wiring material.

The source line S1 and the source line S2 are formed on the second insulating film 12, and covered with the third insulating film 13. The source line S1 and source line 82 can be simultaneously formed by the same wiring material. The third insulating film 13 corresponds to a first interlayer insulating film that covers the switching element.

The first main-common electrode CA1, the first sub-common electrode CB1 and the second sub-common electrode CB2 are formed on the third insulating film 13, and covered with the fourth insulating film 14. The first main-common electrode CAL1 is located above the source line S1, the first main-common electrode CAR1 is located above the source line S2, the first sub-common electrode CBU is located above the gate line G1, the first sub-common electrode CBL is located above the gate line G2, and the second sub-common electrode CB2 is located above the auxiliary capacitance line C1. The first main-common electrode CA1, the first sub-common electrode CB1 and the second sub-common electrode CB2 are formed of transparent electric conductive materials, such as Indium Tin Oxide (ITO) and Indium Zinc Oxide (IZO), for example.

The fourth insulating film 14 corresponds to the second interlayer insulating film that covers the first main-common electrode CA1, the first sub-common electrode CB1 and the second sub-common electrode CB2. The fourth insulating film 14 is formed of a transparent resin material, for example. The fourth insulating film 14 eases level difference by the various wirings and electrodes which are located in the lower layer, and its surface is made approximately flat.

The pixel electrode PE including the second main-pixel electrode PA2, the second sub-pixel electrode PB2, and the third sub-pixel electrode PB3 are formed on the fourth insulating film 14, and covered with the first alignment film AL1. The second main-pixel electrode PA2 is located in an aperture AP with the first main-pixel electrode PA1, and does not overlap with any wirings arranged in the lower layers. The second sub-pixel electrode PB2 and the third sub-pixel electrode PB3 are located in the aperture AP near the gate line G and the first sub-common electrode CB1. A portion of the second sub-pixel electrode PB2 may extend to positions in which the second sub-pixel electrode PB2 overlaps with the gate line G1 and the first sub-common electrode CBU. Similarly, a portion of the third sub-pixel electrode PB3 may extend to positions in which the third sub-pixel electrode PB3 overlaps the gate line G2 or the first sub-common electrode CBL. The pixel electrode PE is formed of transparent electric conductive materials, such as ITO and IZO, for example.

The first alignment film AL1 is arranged on the array substrate AR facing the counter substrate CT, and extends to whole active area ACT. The first alignment film AL1 is arranged also on the fourth interlayer insulating film 14. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the second main-common electrode CA2, and the second alignment film AL2, etc., in the internal surface of the second insulating substrate 20 facing the array substrate AR.

The black matrix BM defines each pixel PX, and forms the aperture AP facing the pixel electrode. That is, the black matrix BM is arranged so that wiring portions, i.e., the source line S, the auxiliary capacitance line C, and the switching element SW may counter the black matrix BM. Herein, the black matrix BM includes a portion located above the source lines S1 and S2 extending along the second direction Y, and a portion located above the gate lines G1 and G2 extending along the first direction X, and is formed in the shape of a lattice. The black matrix BM is formed in an internal surface 20A of the second insulating substrate 20 facing the array substrate AR.

The color filter CF is arranged corresponding to each pixel PX. That is, while the color filter CF is arranged in the aperture AP defined by the black matrix in the internal surface 20A of the second insulating substrate 20, a portion thereof runs on the black matrix BM. The colors of the color filters CF arranged in adjacent pixels PX in the first direction X differ mutually. For example, the color filters CF are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjacent color filters CF is located in a position which overlaps with the black matrix BM. Furthermore, the color filter CF extends to a plurality of adjacent pixels in the second direction Y.

The overcoat layer OC covers the color filter CF. The overcoat layer OC eases influence of concave-convex of the surface of the color filter CF. The overcoat layer OC is formed of a transparent resin material, for example.

The second main-common electrode CA2 is formed on the overcoat layer OC facing the array substrate AR, and located under the black matrix BM. The first main-common electrode CAL1 is located under the second main-common electrode CAL2. The first main-common electrode CAR1 is located under the second main-common electrode CAR2. In the above-mentioned aperture AP, the domains between the pixel electrode PE and the first main-common electrode CA1, and between the pixel electrode PE and the second main-common electrode CA2 correspond to the transmissive domains which can penetrate the backlight.

The second alignment film AL2 is arranged on the counter substrate CT facing the array substrate AR, and extends to whole active area ACT. The second alignment film AL2 covers the second main-common electrode CA2, the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The cell gap is smaller than the intervals L1 to L8. The array substrate AR and the counter substrate CT are pasted together by seal material arranged in a peripheral of the active area, which is not illustrated, while the predetermined cell gap is formed, for example.

The liquid crystal layer LQ is held in a cell gap formed between the array substrate AR and the counter substrate CT, i.e., between the first alignment film AL1 and the second alignment film AL2. The liquid crystal layer LQ contains the liquid crystal molecules LM. For example, the liquid crystal layer LQ is formed of liquid crystal material whose dielectric anisotropy is positive (posi-type).

A first optical element OD1 is attached on an external surface 10B of the array substrate AR, i.e., the external surface of the first insulating substrate 10 which forms the array substrate AR, by adhesives, etc. The first optical element OD1 is located on a side which counters with the backlight unit BL of the liquid crystal display panel LPN, and controls the polarization state of the incident light which enters into the liquid crystal display panel LPN from the backlight unit BL. The first optical element OD1 includes a first polarization plate PL1 having a first polarizing axis AX1. Other optical elements such as retardation film may be arranged between the first polarization plate PL1 and the first insulating substrate 10.

A second optical element OD2 is attached on an external surface 20B of the counter substrate CT, i.e., the external surface of the second insulating substrate 20 which forms the counter substrate CT, by adhesives, etc. The second optical element OD2 is located on a display surface side of the liquid crystal display panel LPN, and controls the polarization state of emitted light from the liquid crystal display panel LPN. The second optical element OD2 includes a second polarization plate PL2 having a second polarizing axis AX2. Other optical elements such as retardation film may be arranged between the second polarization plate PL2 and the second insulating substrate 20.

The first polarizing axis AX1 of the first polarization plate PL1 and the second polarizing axis AX2 of the second polarization plate PL2 are arranged in the Cross Nicol state in which they substantially intersects perpendicularly. At this time, one polarization plate is arranged so that its polarizing axis is arranged substantially in parallel with or in orthogonal with the extending direction of the main-pixel electrode PA or the initial alignment direction of the liquid crystal molecule. In FIG. 3B, the first polarization plate PL1 is arranged so that its first polarizing axis AX1 becomes in parallel to the first direction X. The second polarization plate PL2 is arranged so that its second polarizing axis AX2 becomes in parallel to the second direction Y. Furthermore, in FIG. 3C, the second polarization plate PL2 is arranged so that its second polarizing axis AX2 becomes in parallel to the first direction X. The first polarization plate PL1 is arranged so that its first polarizing axis AX1 becomes in parallel to the second direction Y.

Next, operation of the liquid crystal display panel LPN of the above-mentioned structure is explained.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axes are aligned in a parallel direction with the first alignment treatment direction PD1 of the first alignment film AL1 and the second alignment treatment direction PD2 of the second alignment film AL2 as shown with a dashed line in the figure. In this state, the time of OFF corresponds to the initial alignment state, and the alignment direction of the liquid crystal molecule LM corresponds to the initial alignment direction. Here, the first alignment treatment direction PD1 and the second alignment treatment direction PD2 are substantially in parallel with the second direction Y and same directions each other. At the time OFF, the liquid crystal molecules LM are initially aligned so that their long axes are aligned in parallel to the second direction Y in the X-Y plane as shown in the dashed line in the figure. That is, the initial alignment direction of the liquid crystal molecules is in parallel to the second direction Y.

At the time of OFF, a portion of the backlight from the backlight BL penetrates the first polarization plate PL1, and enters into the liquid crystal display panel LPN. The backlight which entered into the liquid crystal display panel LPN is linearly polarized light which intersects perpendicularly with the first polarizing axis AX1 of the first polarization plate PL1. The polarization state of the linearly polarized light does hardly change when the backlight passes the liquid crystal layer LQ at the time OFF. For this reason, the linearly polarized light which penetrates the liquid crystal display panel LPN is absorbed by the second polarization plate PL2 which is arranged in the Cross Nicol positional relationship with the first polarization plate PL1 (black display).

On the other hand, in case the potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes. That is, the long axes of the liquid crystal molecules rotate in the plane substantially in parallel to the X-Y plane. Thereby, transmissive regions where the backlight can penetrate are formed between the pixel electrode PE and the common electrode CE.

In the embodiment shown in FIG. 3A, in the region between the pixel electrode PE and the second main-common electrode CAL2 in the upper half region of the pixel PX, electric field is formed between pixel electrode PE (the first main-pixel electrode PA1 and the second sub-pixel electrode PB2) and the common electrode CE (the first main-common electrode CAL1, the second main-common electrode CAL2 and the second sub-common electrode CB2), respectively. The formed electric field interacts in the upper half region of the pixel among the above electrodes. Accordingly, the liquid crystal molecule LM mainly rotates clockwise to the second direction Y, and turns to the lower left in the figure. Furthermore, in the lower half region of the pixel PX, the electric field is formed between the pixel electrode PE (the second main-pixel electrode PA2 and the third sub-pixel electrode PB3) and the common electrode CE (the first main-common electrode CAL1, the second main-common electrode CAL2 and the second sub-common electrode CB2), respectively. The formed electric field interacts in the lower half region of the pixel. Accordingly, the liquid crystal molecule LM mainly rotates counterclockwise to the second direction Y, and turns to the upper left in the figure.

In the region between the pixel electrode PE and the second main-common electrode CAR2 in the upper half portion of the pixel PX, electric field is formed between the main-pixel electrode PE (the first main-pixel electrode PA1 and the first sub-pixel electrode PB1) and the common electrode CE (the first main-common electrode CAR1, the second main-common electrode CAR2 and the first sub-common electrode CBU), respectively. The formed electric field interacts in the upper half portion of the pixel among the above electrodes. Accordingly, the liquid crystal molecule LM mainly rotates clockwise to the second direction Y, and turns to the upper light in the figure. Furthermore, in the lower half portion of the pixel PX, the electric field is formed between the pixel electrode PE (the second main-pixel electrode PA2 and the first sub-pixel electrode PB1), and the common electrode CE (the first main-common electrode CAR1, the second main-common electrode CAR2 and the first sub-common electrode CBL), respectively. The formed electric field interacts in the lower half portion of the pixel among the above electrodes. Accordingly, the liquid crystal molecule LM mainly rotates counterclockwise to the second direction Y, and turns to the lower right in the figure.

Thus, at the time of ON, in the domain of the upper half portion of the pixel PX, the liquid crystal molecule LM rotates clockwise, and also rotates clockwise to the second direction Y in the position which overlaps with first main-pixel electrode PA1. Moreover, at the time of ON, in the domain of the bottom half portion of the pixel PX, the liquid crystal molecule LM rotates counterclockwise, and also rotates counterclockwise to the second direction Y in the position which overlaps with second main-pixel electrode PA2. That is, the alignment direction of the liquid crystal molecule LM is divided into two directions bordering on the position in which the liquid crystal molecule LM overlaps with the first sub-pixel electrode PB1 and the second sub-common electrode CB2, and the domain is formed corresponding to each alignment direction. That is, two domains are formed in one PX. In addition, in the position which the liquid crystal molecule LM overlaps with first main-common electrode CA1 and second main-common electrode CA2, the liquid crystal molecule LM hardly rotates at the time of ON, but maintains the initial alignment state.

At the time of ON, the linearly polarized light which intersects perpendicularly with the first polarizing axis AX1 of the first polarization plate PL1 enters into the liquid crystal display panel LPN, and the polarization state changes when passing the liquid crystal layer LQ, in accordance with the alignment state of the liquid crystal molecule LM. For this reason, at the time of ON, at least a portion of the backlight which passed the liquid crystal layer LQ penetrates the second polarization plate PL2 (white display).

According to this embodiment, the first main-pixel electrode PA1 and the second main-pixel electrode PA2 are located in the region corresponding to the aperture AP and formed of a transparent electric conductive material. Moreover, the first main-pixel electrode PA1 and the second main-pixel electrode PA2 extend in a different direction (third direction D3 or fourth direction D4) from the initial alignment direction of the liquid crystal molecule LM (the second direction Y). In the pixel PX, the liquid crystal molecule LM of the domain of the both sides sandwiching the first main-pixel electrode PA1 rotates in the same direction (for example, clockwise rotation) in the X-Y plane at the time of ON. Similarly, in the pixel PX, the liquid crystal molecule LM of the domain of the both sides sandwiching the second main-pixel electrode PA2 rotates in the same direction (for example, counterclockwise rotation) in the X-Y plane at the time of ON. For this reason, at the time of ON, the liquid crystal molecule LM located above the first main-pixel electrode PA1 and the second main-pixel electrode PA2 also rotate, and are alignment controlled by electric field like other transmissive domains. Thereby, the regions above the first main-pixel electrode PA1 and the second main-pixel electrode PA2 contribute to the display. According to this embodiment, it is possible to improve the transmissivity in the aperture AP comparing to the structure in which the first main-pixel electrode PA1 and the second main-pixel electrode PA2 extend in parallel to the initial alignment direction of the liquid crystal molecule LM.

In this embodiment, if the extending direction of the first main-pixel electrode PA1 and the second main-pixel electrode PA2 incline about several degrees, the liquid crystal molecule which overlaps with the first main-pixel electrode PA1 and the second main-pixel electrode PA2 rotates at the time of ON, and contributes to the display. However, if the extending direction of the first main-pixel electrode PA1 and the second main-pixel electrode PA2 largely incline to the initial alignment direction in the pixel, the difference between the interval L1 and the interval L3 becomes large, and the strength of electric field which acts on the liquid crystal molecule LM in the respective domains becomes different each other differ. For example, if electric field which acts on the liquid crystal molecule LM in one domain is too strong, the liquid crystal molecule LM rotates too much, and exceeds the conditions in which high transmissivity is obtained. Accordingly, the transmissivity falls as a result. For this reason, it is preferable to set up the difference between the interval L1 and the interval L3 to an extent in which the difference of transmissivity is not generated in the domains in the pixel. When the initial alignment direction of the liquid crystal molecule LM crosses the gate line at right angles, it is preferable that the extension of the first main-pixel electrode PA1 and the second main-pixel electrode PA2 intersect gate line first, and then intersect the source line. That is, it is preferable that, firstly, the extension of the main-pixel electrode intersects the first wiring which orthogonally crosses the initial alignment direction, and then crosses the second wiring which orthogonally intersects the first wiring. As a result of the practical review by the inventors, it is preferable that an angle θ1 made by the third direction D3 to which the first main-pixel electrode PAZ extends and the second direction. Y, or an angle θ2 made by the fourth direction D4 to which the second main-pixel electrode PA2 extends and the second direction Y is set to an angle larger than 0° and smaller than 15°.

According to this embodiment, the first main-common electrode CA1 located above the source line S and the second main-common electrode CA2 located under the black matrix BM extend in parallel to the initial alignment direction of the liquid crystal molecule LM (the second direction Y). For this reason, at the time of ON, the liquid crystal molecule LM of the region which overlaps with the first main-common electrode CA1 and the second main-common electrode CA2 maintains the same initial alignment state as the time of OFF (a black display), and does not contribute to the display. For this reason, even if assembling shift occurs between the array substrate AR and the counter substrate CT, leak of undesirable electric field to the adjacent pixels can be controlled.

Therefore, in the case where the colors of the color filter CF differ between the adjacent pixels according to this embodiment, it becomes possible to suppress generation of mixed color comparing with the case where the first main-common electrode CA1 and the second main-common electrode CA2 extend in the initial alignment direction of the liquid crystal molecule LM. Moreover, even if it is a case where the liquid crystal display panel is observed from an oblique direction, it becomes possible to control the generation of the mixed colors because the light does not penetrate the region which overlaps with the first main-common electrode CA1 or the second main-common electrode CA2.

Moreover, according to this embodiment, since the first sub-common electrode CB1 is arranged so as to overlap with the gate line G, undesirable leaked electric field can be shielded from the gate line G. The first sub-common electrode CB1 functions as a gate shield electrode. Therefore, the influence of undesirable electric field in the region close to the gate line G in the transmissive region is eased, and it becomes possible to control degradation of display grace.

Moreover, according to this embodiment, since the first main-common electrode CA1 is arranged so as to overlap with the source line S, undesirable leaked electric field can be shielded from the source line S. The first main-common electrode CA1 functions as a source shield electrode. Therefore, the influence of undesirable electric field from the source line S is eased, and it becomes possible to control degradation of display grace.

Moreover, according to this embodiment, it becomes possible to form two or more domains in one pixel. For this reason, a viewing angle can be optically compensated in two or more directions, and wide viewing angle can be attained.

According to this embodiment, in the common electrode CE, the first main-common electrode CA1, the first sub-common electrode CB1 and the second sub-common electrode CB2 are electrically connected mutually, and the second main-common electrode CA2 is electrically connected with the first main-common electrode CA1. For this reason, even if disconnection occurs in the common electrodes CE, it becomes possible to supply common potential stably, and to control the generation of a poor display.

In addition, although the above-mentioned example explains the case where the initial alignment direction of the liquid crystal molecule LM is in parallel to the second direction Y, the initial alignment direction of the liquid crystal molecule LM may be the oblique direction which obliquely crosses the second direction Y.

Moreover, in this embodiment, although the case where the liquid crystal layer LQ is formed of the liquid crystal material which has positive (positive type) dielectric constant anisotropy, the liquid crystal layer LQ may be formed of the liquid crystal material which has negative (negative type) dielectric constant anisotropy.

Next, a second embodiment is explained. In the following explanation, the same referential mark is attached to the same element as the first embodiment and detailed explanation is omitted.

Figure 6:
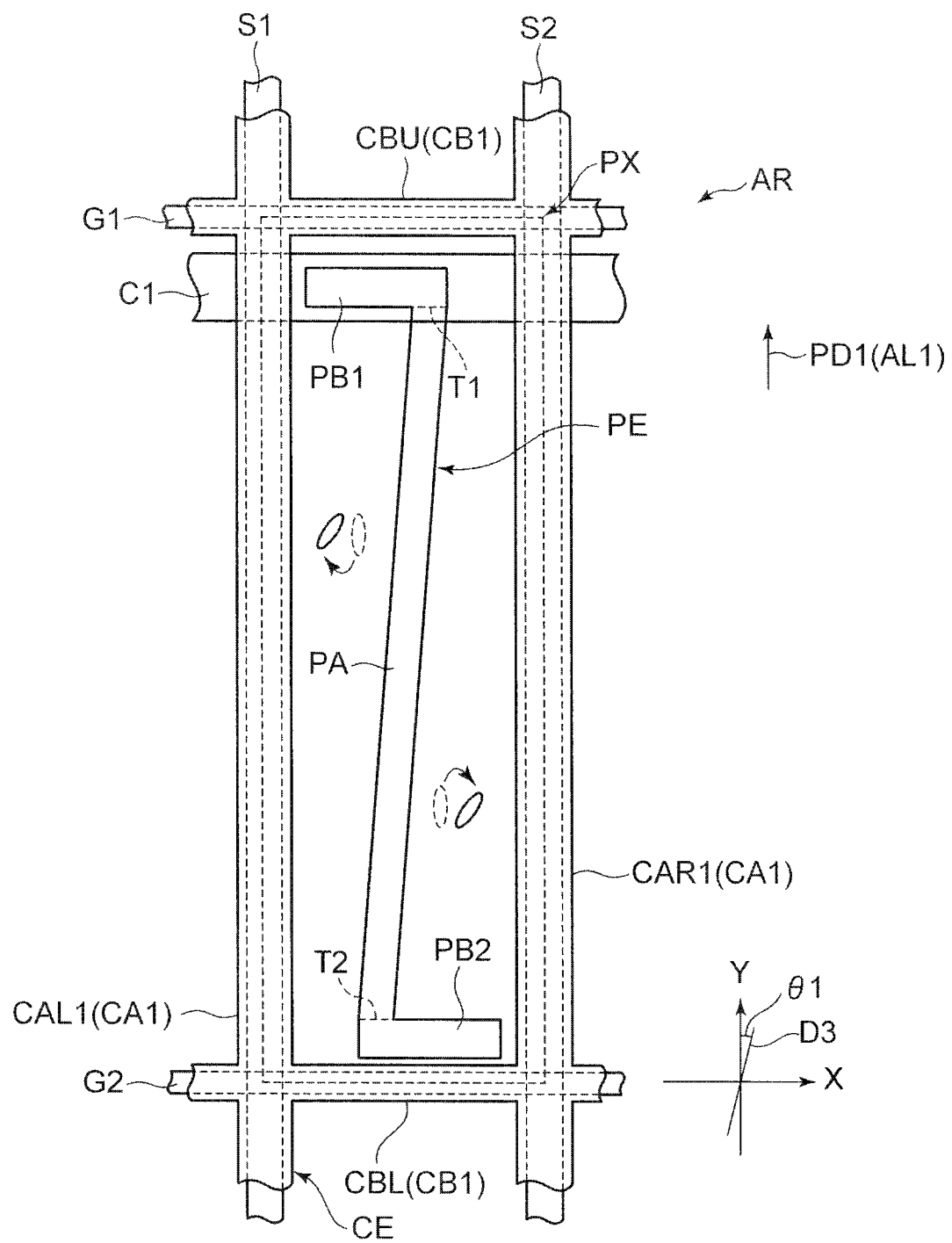
FIG. 6 is a plan view schematically showing a structure of one pixel when the array substrate AR shown in FIG. 1 is seen from the counter substrate side according to a second embodiment.

FIG. 6 is a plan view schematically showing a structure of one pixel when the array substrate AR shown in FIG. 1 is seen from the counter substrate side according to a second embodiment.

In this second embodiment, the position of the auxiliary capacitance line C1 and the form of the pixel electrode PE are different from the first embodiment.

That is, while the auxiliary capacitance line C1 is located between the gate line G1 and the gate line G2, the auxiliary capacitance line C1 is arranged more close to the gate line G1 than the gate line G2. That is, the interval between the gate line G1 and the auxiliary capacitance line C1 in the second direction Y is smaller than the interval between the gate line G2 and the auxiliary capacitance line C1 in the second direction Y.

The pixel electrode PE is equipped with the main-pixel electrode PA, the first sub-pixel electrode PB1, and the second sub-pixel electrode PB2. The main-pixel electrodes PA, the first sub-pixel electrode PB1, and the second sub-pixel electrode PB2 are integrally or continuously formed, and electrically connected mutually. The pixel electrode PE is formed in the shape of "Z" by the main-pixel electrode PA, the first sub-pixel electrode PB1, and the second sub-pixel electrode PB2.

The main-pixel electrode PA is located between the source line S1 and the source line S2, and between the gate line G2 and the auxiliary capacitance line C1. The main-pixel electrode PA linearly extends in the third direction D3 different from the first direction X and the second direction Y, and is formed in the shape of a belt with substantially the same width. In this embodiment, the main-pixel electrode PA includes a first end T1 located on the auxiliary capacitance line C1 side, and a second end T2 located on the gate line G2 side. The first end T1 is arranged more close to the source line S2 than the source line S1, and the second end T2 is arranged more close to the source line S1 than the source line S2.

The first sub-pixel electrode PB1 is located on the auxiliary capacitance line C1. Moreover, the first sub-pixel electrode PB1 linearly extends between the source line S1 and the source line S2 along the first direction X, and formed in a belt shape with substantially the same width. In this embodiment, the first sub-pixel electrode PB1 is connected with the first end T1 of the main-pixel electrode PA, and extends in the first direction X toward the source line S1. The first sub-pixel electrode PB1 hardly extends in the direction toward the source line S2 from the position connected with the first end T1.

The second sub-pixel electrode PB2 linearly extends between the source line S1 and the source line S2 along the first direction X, and formed in a belt shape with substantially the same width. In this embodiment, the second sub-pixel electrode PB2 is connected with the second end T2 of the main-pixel electrode PA, and extends in the first direction X toward the source line S2 along the gate line G2. The second sub-pixel electrode PB2 hardly extends in the direction toward the source line S1 from the position connected with the first end T2.

The common electrode CE is arranged apart from the pixel electrode PE. The common electrode CE includes the first main-common electrode CA1 and the first sub-common electrode CB1 and is formed integrally or continuously so as to electrically connect mutually. They are set to common potential. In this embodiment, the first main-common electrode CA1 is arranged in parallel two lines in the first direction X at intervals each other, and equipped with the first main-common electrode CAL1 located in the left-hand side end of the pixel PX, and the first main-common electrode CAR1 located in the right-hand side end of the pixel PX. The first main-common electrode CAL1 counters the source line S1, and the first main-common electrode CAR1 counters the source line S2. Moreover, the first sub-common electrode CB1 is arranged in two parallel lines in the second direction Y at intervals. The first sub-common electrode CB1 includes a first sub-common electrode CBU located in the upper end portion of the pixel PX, and the first sub-common electrode CBL located in the bottom end portion of the pixel PX. The first sub-common electrode CBU counters the gate line G1, and the first sub-common electrode CBL counters the gate line G2.

The array substrate shown in FIG. 6 can be combined with the counter substrate CT shown in FIG. 3 like the first embodiment. The first main-common electrode CA1 of the array substrate AR counters the second main-common electrode CA2 of the counter substrate CT.

In this second embodiment, the liquid crystal molecule initially aligned in the second direction Y rotates clockwise in the X-Y plane at the time of ON. Furthermore, the liquid crystal molecule overlapping with the main-pixel electrode PA similarly rotates. For this reason, the same effect as the above first embodiment is acquired.

In addition, in the array substrates AR of the first and second embodiments, the pixel electrode PE and the common electrode CE may be formed in the same layer as far as they are apart from each other. For example, it is possible to form the pixel electrode PE and the common electrode CE on the third insulating film 13 without forming the fourth insulating film 14 and to cover them with the first alignment film AL1.

Figure 7:
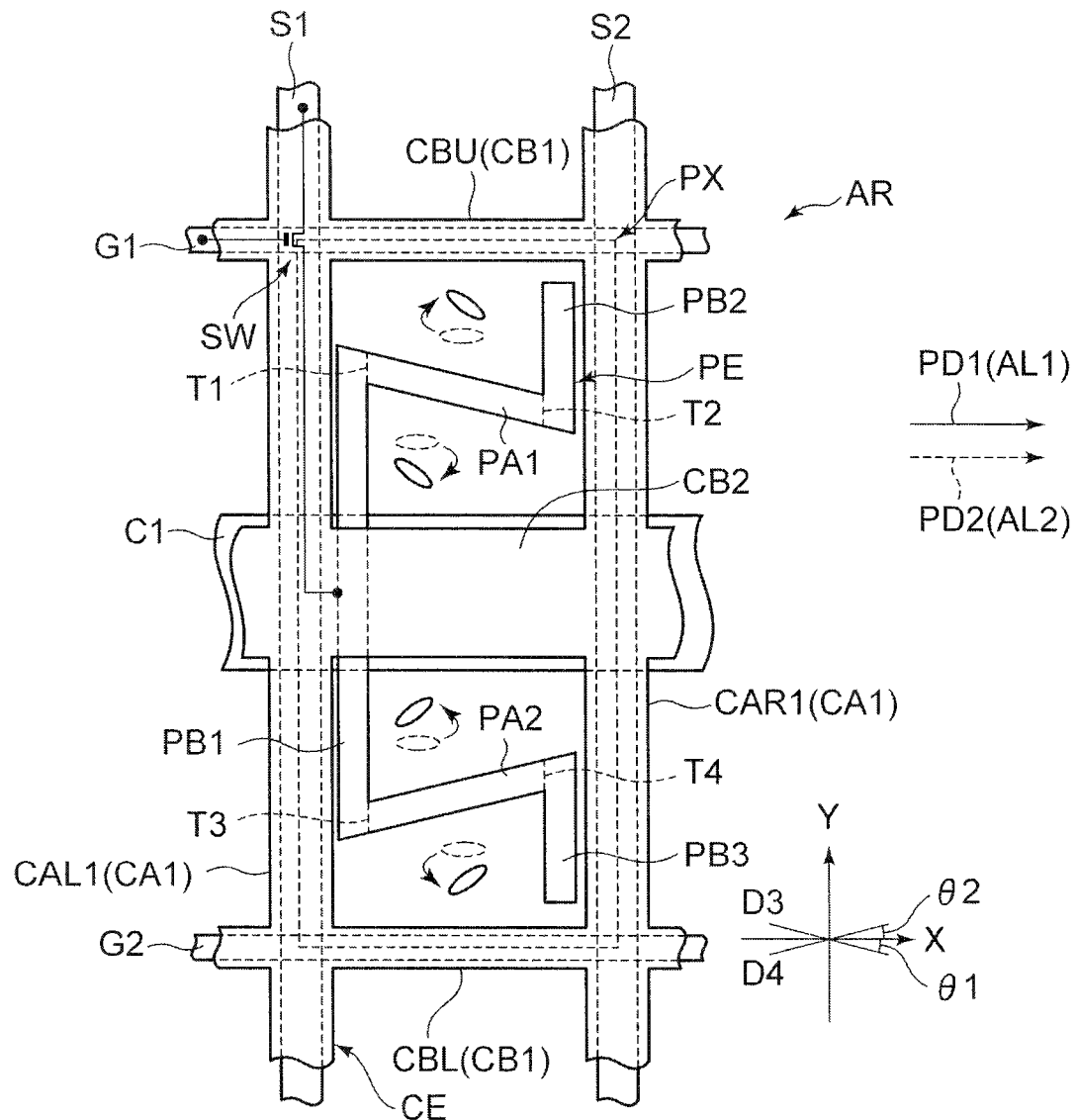
FIG. 7 is a plan view schematically showing a structure of one pixel when the array substrate AR shown in FIG. 1 is seen from the counter substrate side according to a third embodiment.

FIG. 7 is a plan view schematically showing a structure of one pixel when the array substrate shown in FIG. 1 is seen from the counter substrate side according to a third embodiment.

The third embodiment is different in the form of the pixel electrode PE from the first embodiment.

The pixel electrode PE is equipped with the first main-pixel electrode PA1, the second main-pixel electrode PA2, the first sub-pixel electrode PB1, the second sub-pixel electrode PB2, and the third sub-pixel electrode PB3. The first main-pixel electrode PA1, the second main-pixel electrode PA2, the first sub-pixel electrode PB1, the second sub-pixel electrode PB2, and the third sub-pixel electrode PB3 are integrally or continuously formed, and electrically connected mutually.

The first main-pixel electrode PA1 is located between the source line S1 and the source line S2, and between the gate line G2 and the auxiliary capacitance line C1. The first main-pixel electrode PA1 linearly extends in the third direction D3 different from the first direction X and the second direction Y, and is formed in the shape of a belt with substantially the same width. In this embodiment, the angle θ1 made by the third direction D3 and the first direction X is smaller than the angle made by the third direction D3 and the second direction Y. In this embodiment, the first main-pixel electrode PA1 includes a first end T1 located on the source line S1 side, and a second end T2 located on the source line S2 side. The first end T1 is arranged more close to the gate line G1 than the auxiliary capacitance line C1, and the second end T2 is arranged more close to the auxiliary capacitance line C1 than the gate line G1.

The second main-pixel electrode PA2 is located between the source line S1 and the source line S2, and between the gate line G2 and the auxiliary capacitance line C1. The second main-pixel electrode PA2 linearly extends in a fourth different direction D4 different from the first direction X, the second direction Y, and the third direction D3, and is formed in the shape of a belt with substantially the same width. In this third embodiment, the angle θ2 made by the fourth direction D4 and the first direction X is smaller than the angle made by the fourth direction D4 and the second direction Y. For example, the fourth direction D4 and the third direction D3 are line symmetric with respect to the first direction X. The angle θ1 is substantially the same as the angle θ2. In this embodiment, the second main-pixel electrode PA2 has a third end T3 located on the source line S1 side, and a fourth end T4 located on the source line S2 side. The third end T3 is arranged more close to the gate line G2 rather than the auxiliary capacitance line C1, and the fourth end T4 is arranged more close to the auxiliary capacitance line C1 than the gate line G2.

The first sub-pixel electrode PB1 intersects the auxiliary capacitance line C1. Moreover, the first sub-pixel electrode PB1 linearly extends between the gate line G1 and the gate line G2 along the second direction Y, and is formed in the shape of a belt with substantially the same width. In this embodiment, the first sub-pixel electrode PB1 is connected with the first end T1 of the first main-pixel electrode PA1 and the third end T3 of the second main-pixel electrode PA2, and extends in the second direction Y along the source line S1. The first sub-pixel electrode PB1 hardly extends in the direction from the position connected with the first end T1 toward the gate line G1, and also hardly extends in the direction from the position connected with the third end T3 toward the gate line G2.

The second sub-pixel electrode PB2 linearly extends between the gate line G1 and the auxiliary capacitance line C1 along the second direction Y, and is formed in a belt shape with substantially the same width. In this embodiment, the second sub-pixel electrode PB2 is connected with the second end T2 of the first main-pixel electrode PA1, and extends in the second direction Y along the source line S2 toward the gate line G1. The second sub-pixel electrode PB2 hardly extends in the direction from the position connected with the second end T2 toward the auxiliary capacitance line C1.

The third sub-pixel electrode PB3 linearly extends between the gate line G2 and the auxiliary capacitance line C1 along the second direction Y, and is formed in a belt shape with substantially the same width. In this embodiment, the third sub-pixel electrode PB3 is connected with the fourth end T4 of the second main-pixel electrode PA2, and extends in the second direction Y along the source line S2 toward the gate line G2. The third sub-pixel electrode PB3 hardly extends in the direction from the position connected with the fourth end T4 toward the auxiliary capacitance line C1.

In the pixel electrode PE, the first main-pixel electrode PA1, the first sub-pixel electrode PB1, and the second sub-pixel electrode PB2 form a "Z" shape. Similarly, the second main-pixel electrode PA2, the first sub-pixel electrode PB1, and the third sub-pixel electrode PB3 form a "Z" shape. Moreover, the pixel electrode PE has the form of line symmetric with respect to the auxiliary capacitance line C1.

The common electrode CE is arranged apart from the pixel electrode PE. The common electrode CE includes the first main-common electrode CA1, the first sub-common electrode CB1 and the second sub-common electrode CB2 and formed integrally or continuously so as to electrically connect mutually. They are set to common potential. In this embodiment, the first main-common electrode CA1 is arranged in parallel two lines in the first direction X at intervals each other, and equipped with the first main-common electrode CAL1 located in the left-hand side end of the pixel PX, and the first main-common electrode CAR1 located in the right-hand side end of the pixel PX. The first main-common electrode CAL1 counters the source line S1, and the first main-common electrode CAR1 counters the source line S2. Moreover, the first sub-common electrode CB1 is arranged in two parallel lines in the second direction Y at intervals. The first sub-common electrode CB1 includes a first sub-common electrode CBU located in the upper end portion of the pixel PX and the first sub-common electrode CBL located in the bottom end portion of the pixel PX. The first sub-common electrode CBU counters the gate line G1, and the first sub-common electrode CBL counters the gate line G2. The second sub-common electrode CB2 is located on the auxiliary capacitance line C1 and extends in the first direction X.

The array substrate shown in FIG. 7 can be combined with the counter substrate CT shown in FIG. 3 like the first embodiment. The first main-common electrode CA1 of the array substrate AR counters the second main-common electrode CA2 of the counter substrate CT. In addition, the first alignment treatment direction PD1 of the first alignment film AL1 and the second alignment treatment direction PD2 of the second alignment film AL2 are substantially in parallel to the first direction X. The first alignment treatment direction PD1 and the second alignment treatment direction PD2 may be the same directions as shown in the figure or opposite directions each other.

In this third embodiment, as shown in the figure, the liquid crystal molecule LM is initially aligned in the first direction X. At the time of ON, the liquid crystal molecule arranged in the regions sandwiching the first main-pixel electrode PA1 rotates clockwise in the X-Y plane. Furthermore, the liquid crystal molecule LM which overlaps with the first main-pixel electrode PA1 rotates similarly. At the time of ON, the liquid crystal molecule arranged in the regions sandwiching the second main-pixel electrode PA2 rotates counterclockwise in the X-Y plane. In addition, the liquid crystal molecule LM which overlaps with the second main-pixel electrode PA2 rotates similarly. For this reason, the same effect as the first embodiment is acquired.

In this third embodiment, the second sub-common electrode CB2 intersects the first sub-pixel electrode PB1. Therefore, in the array substrate AR, the pixel electrode PE is located in a different layer from the common electrode CE through an insulating film which is not shown. In this embodiment shown in FIG. 7, the pixel electrode PE is located in a lower layer than the common electrode CE. Since the pixel electrode PE is electrically connected with the switching element SW in the position which overlaps with the auxiliary capacitance line C1, it is preferable to arrange the pixel electrode PE in a lower layer than the common electrode CE. When the pixel electrode PE is electrically connected with the switching element SW in a different position from the position on the auxiliary capacitance line C1, the pixel electrode PE may be arranged in an upper layer than the common electrode CE.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:
1. A liquid crystal display device, comprising:
   a first substrate including;
      a gate line extending in a first direction,
      a source line extending in a second direction orthogonally crossing the first direction,
      a switching element electrically connected with the gate line and the source line, a first sub-common electrode extending in the first direction and facing the gate line,
a first main-common electrode connected with the first sub-common electrode and extending in the second direction, the first main-common electrode facing the source line, and
a pixel electrode including a main-pixel electrode linearly extending in a direction different from the first and second directions, the pixel electrode electrically connected with the switching element and formed of transparent conductive material,
a second substrate including a second main-common electrode extending in the second direction so as to face the first main-common electrode, wherein the potential of the second main-common electrode is the same as the first main-common electrode; and
a liquid crystal layer held between the first substrate and the second substrate, wherein
the pixel electrode includes a first sub pixel electrode connected with a first end of the main-pixel electrode and extending in the first direction, and a second sub-pixel electrode connected with a second end of the main-pixel electrode and extending in the first direction, and the pixel electrode is formed in a "Z" shape,
the first substrate includes an auxiliary capacitance line extending in the first direction,
the first sub-pixel electrode is located on the auxiliary capacitance line, and the second sub-pixel electrode is arranged apart from the first sub-common electrode along the gate line,
the first substrate includes a second sub-common electrode connected with the first main-common electrode and located on the auxiliary capacitance line, and
the second sub-common electrode extends in the first direction and is arranged apart from the first sub-pixel electrode.

2. The liquid crystal display device according to claim 1, wherein the extending direction of the main-pixel electrode is arranged so that the angle made by the extending direction of the main-pixel electrode and the second direction is smaller than the angle made by the main-pixel electrode and the first direction.

3. The liquid crystal display device according to claim 1, wherein
the first main-common electrode and the first sub-common electrode are formed of Indium Tin Oxide (ITO) or Indium Zinc Oxide (IZO).

4. A liquid crystal display device, comprising:
a first substrate including;
a gate line extending in a first direction,
a source line extending in a second direction orthogonally crossing the first direction,
a switching element electrically connected with the gate line and the source line,
a first interlayer insulating film covering the switching element,
a first sub-common electrode formed on the first interlayer insulating film extending in the first direction and facing the gate line,
a first main-common electrode formed on the first interlayer insulating film and connected with the first sub-common electrode, the first main-common electrode extending in the second direction and facing the source line,
a second interlayer insulating film covering the first sub-common electrode and the first main-common electrode, and
a pixel electrode including a main-pixel electrode formed on the second interlayer insulating film and linearly extending in a direction different from the first and second directions, the pixel electrode electrically connected with the switching element,
a second substrate including a second main-common electrode extending in the second direction so as to face the first main-common electrode, wherein the potential of the second main-common electrode is the same as the first main-common electrode; and
a liquid crystal layer held between the first substrate and the second substrate, wherein
the pixel electrode includes a first sub-pixel electrode connected with a first end of the main-pixel electrode and extending in the first direction, and a second sub-pixel electrode connected with a second end of the main-pixel electrode and extending in the first direction, and the pixel electrode is formed in a "Z" shape,
the first substrate includes an auxiliary capacitance line extending in the first direction,
the first sub-pixel electrode is located on the auxiliary capacitance line, and the second sub-pixel electrode is arranged apart from the first sub-common electrode along the gate line.,
the first substrate includes a second sub-common electrode connected with the first main-common electrode and located on the auxiliary capacitance line, and the second sub-common electrode extends in the first direction and is arranged apart from the first sub-pixel electrode.

5. The liquid crystal display device according to claim 4, wherein
the first main-common electrode and the first sub-common electrode are formed of Indium Tin Oxide (ITO) or Indium Zinc Oxide (IZO).

6. A liquid crystal display device, comprising:
a first substrate including;
a first gate line and a second gate line respectively extending in a first direction,
an auxiliary capacitance line arranged between the first gate line and the second gate line and extending in a first direction,
a first source line and a second source line extending in a second direction orthogonally crossing the first direction,
a switching element electrically connected with the first gate line and the first source line,
a first sub-common electrode extending in the first direction and facing the gate line,
a first main-common electrode connected with the first sub-common electrode, the first main-common electrode extending in the second direction and facing the source line, and
a pixel electrode electrically connected with the switching element,
a second substrate including a second main-common electrode extending in the second direction on the both sides sandwiching the pixel electrode; and
a liquid crystal layer held between the first substrate and the second substrate,
wherein the pixel electrode includes;
a first main-pixel electrode linearly extending between the first gate line and the auxiliary capacitance line in a direction different from the first and second directions, the first main-pixel electrode including a first end located on the auxiliary capacitance line side more close to the first source line than the second source line, and a second end located on the first gate line side more close to the second source line than the first source line, a second main-pixel electrode linearly extending between the second gate line and the auxiliary capacitance line in a direction different from the first and second directions, the second main-pixel electrode including a third end located on the auxiliary capacitance line side more close to the first source line than the second source line, and a fourth end located on the second gate line side more close to the second source line than the first gate line, a first sub-pixel electrode connected with the first and third ends on the auxiliary capacitance line and extending toward the second source line in the first direction, a second sub-pixel electrode connected with the second end and extending toward the first source line along the first gate line in the first direction, and a third sub-pixel electrode connected with the fourth end and extending toward the first source line along the second gate line in the first direction, the first sub-pixel electrode is located on the auxiliary capacitance line, and the second and third sub-pixel electrodes are arranged apart from the first sub-common electrode along the gate line, the first substrate includes a second sub-common electrode connected with the first main-common electrode and located on the auxiliary capacitance line, and the second sub-common electrode extends in the first direction and is arranged apart from the first sub-pixel electrode.

* * * * *